(12) United States Patent
Ilyashenko et al.

(10) Patent No.: US 9,213,135 B2
(45) Date of Patent: Dec. 15, 2015

(54) CLAD MODE STRIPPER

(71) Applicant: IPG PHOTONICS CORPORATION, Oxford, MA (US)

(72) Inventors: Victor Ilyashenko, Northborough, MA (US); Karina Barseguian, Shrewsbury, MA (US); Leonid Klebanov, Hopkinton, MA (US); Anton Drozhzhin, Avon, CT (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 14/724,159

(22) Filed: May 28, 2015

(65) Prior Publication Data

US 2015/0260911 A1    Sep. 17, 2015

Related U.S. Application Data

(63) Continuation of application No. PCT/US2013/072223, filed on Nov. 27, 2013.

(60) Provisional application No. 61/730,798, filed on Nov. 28, 2012.

(51) Int. Cl.
| | |
|---|---|
| *H01S 3/067* | (2006.01) |
| *G02B 6/02* | (2006.01) |
| *H01S 3/10* | (2006.01) |
| *H01S 3/091* | (2006.01) |
| *H01S 3/30* | (2006.01) |

(52) U.S. Cl.
CPC ............ *G02B 6/02052* (2013.01); *H01S 3/067* (2013.01); *H01S 3/06754* (2013.01); *H01S 3/091* (2013.01); *H01S 3/10023* (2013.01); *H01S 3/302* (2013.01)

(58) Field of Classification Search
CPC ..... H01S 3/067; H01S 3/06754; H01S 3/091; H01S 3/10023; H01S 3/302; G02B 6/02052
See application file for complete search history.

(56) References Cited

U.S. PATENT DOCUMENTS

2010/0135339 A1*   6/2010   Meleshkevich .... G02B 6/03616
                                                                    372/6

* cited by examiner

*Primary Examiner* — Armando Rodriguez
(74) *Attorney, Agent, or Firm* — Timothy J. King, Esq.; Yuri Kateshov, Esq.

(57) ABSTRACT

A clad mode stripper is provided on a passive double-clad fiber guiding amplified light signal downstream from a gain block. The fiber is configured with an upstream end stripped from a protective coating. A light absorbing mixture is applied to the exposed cladding of the fiber receiving unwanted pump light. The mixture includes a host material and a plurality of diffusers which are operative to scatter cladding light incident thereon and embedded in the host material so as to define upstream and downstream decoupling zones. The diffusers are selected from either silicone polymers with a refractive index lower than that of the host material or from metal particles and lower the effective refractive index of the mixture so that it at most equal to that of the cladding. The mixture is operative to gradually remove substantially entire unwanted light guided by the cladding so that the downstream decoupling zone is heated at a temperature lower than that of the upstream zone.

32 Claims, 4 Drawing Sheets

CLAD MODE STRIPPER

BACKGROUND OF THE DISCLOSURE

1. Field of Disclosure

The disclosure relates to high power fiber laser systems. In particular, the disclosure relates to a clad mode stripper ("CMS") operative to remove undesirable high power cladding-guided light during a switch-on phase of system operation.

2. Prior Art

At high optical power levels of single mode fiber laser systems, based on a double clad fiber, which includes a core, inner cladding and outer protective polymer and is operative to emit output beam of the order of tens of kilowatts in substantially a single mode operation, the task of managing stray light propagating along the inner cladding becomes crucial. Even a small fraction of stray light in the cladding can heat a protective polymer to damaging temperatures and cause a catastrophic failure of the fiber.

High thermal stresses generated by a rapid temperature rise during the initial, switch-on operational phase of a high power fiber laser system, when the system's output increases from 0 watt to the desired high power, are particularly damaging to double-clad fibers which are used in kW-level fiber laser systems. Typically, a time period associated with the switch-on phase does not exceed about 100 milliseconds and characterized by a localized decoupling of clad modes at the upstream end of the fiber. Accordingly, the cladding modes need to be safely removed which is typically realized by a clad mode stripper ("CMS") the known configurations of which are briefly discussed hereinbelow.

One of numerous CMS configurations includes a small strip of high index silicone placed over the inner low index cladding along upstream end of a fiber which is stripped from the protective polymer. However, because the coupling is localized and the length of the coated high index silicone is short, the latter is often overheated and decomposed.

A need therefore exists for a device minimizing thermal stress during the switch on phase of a high power fiber laser system.

SUMMARY OF THE DISCLOSURE

The disclosed CMS satisfies this need by generating a low temporal thermal gradient dT/dt, wherein T is a temperature of CMS's material at a desired output power level, and t is time necessary for the output power to reach the desired level. The low temporal thermal gradient reduces the possibility of damaging the most vulnerable upstream part of a fiber during the switch-on phase of a high power fiber system's operation during when which a light power surges from zero to the desired kW level.

The disclosed CMS is configured with a layer of silicone covering the upstream end of a passive SM fiber coupled to the output of the amplifying fiber of a high power SM fiber laser system. The fiber has a double-clad configuration in which the upstream portion of a protective polymer, covering the upstream part of the cladding, is replaced by a mixture which includes a host material and a plurality of diffusers embedded in the host material so as to define an upstream decoupling zone and at least one downstream decoupling zone.

At the start of the switch-on phase, a front of unabsorbed pump light is coupled into the cladding and, as it propagates along the very upstream of the CMS, the guided light is incident on diffusers along the upstream decoupling zone. The diffusers omnidirectionally scatter the incident light with a fraction of scattered light remaining in the host material or decoupling therefrom. In either case the material is heated which affects its refraction index.

The refractive index is a critical parameter that determines the operational properties of a photonic device, and knowing its dependence on temperature is crucial for designing photonic devices. In silicone, as temperature rises the refractive index lowers. Accordingly, scattered light heats the upstream zone of the CMS to a temperature which is insufficient to destroy the host material, but sufficient to lower its refractive index along this upstream zone of the CMS below that of quartz. As recognized by one of ordinary skill in the art, at his point, the cladding remains a waveguiding structure.

Accordingly, the un-scattered light and unabsorbed pump light following the front of the initially coupled unabsorbed pump light continue to propagate along the cladding and impinge upon diffusers of the downstream zone. As a consequence, the downstream zone of the CMS is heated by a further fraction of scattered decoupled light and reduces its refractive index below that of the cladding. Such a sequential decoupling of clad light may continue along the entire length of the CMS while the power increases to its desired level. By the time the latter is reached, the cladding light is removed by the CMS which remains structurally sound.

The host material of the CMS includes silicone with a refractive index which substantially equal to or slightly lower than that of quartz/cladding at room temperature. Alternatively, silicone may have a slightly higher refractive index than that of the cladding at room temperature.

The diffusers may be selected from a variety of silicone-based materials which when embedded in silicone host material do not bond therewith. Accordingly, diffusers form scattering centers which interact with cladding light incident thereon.

One configuration of the disclosed CMS includes metal oxides such as Al2O3 embedded in silicone. The distribution of these particles may have a uniform profile along the entire length of the CMS, step-wise profile with the CMS's downstream region having a higher concentration of diffusers than that of the upstream end, or gradually increasing profile towards the downstream region.

In alternative configuration of the disclosed CMS, silicone host material is mixed with diffusers also made from silicon but with a refractive index which is lower than that of the host material. Silicone based diffusers lower the effective refractive index of the mixture to be at most equal to that of quartz—material of cladding. The silicone-based diffusers do not bond with silicone host material and form centers of haziness which function as scattering centers in the host material.

BRIEF DESCRIPTION OF THE DRAWINGS

The above and other features and advantages of the disclosed CMS will become more readily apparent from the following specific description in conjunction with the attached drawings, in which.

SPECIFIC DESCRIPTION

Figure 1:
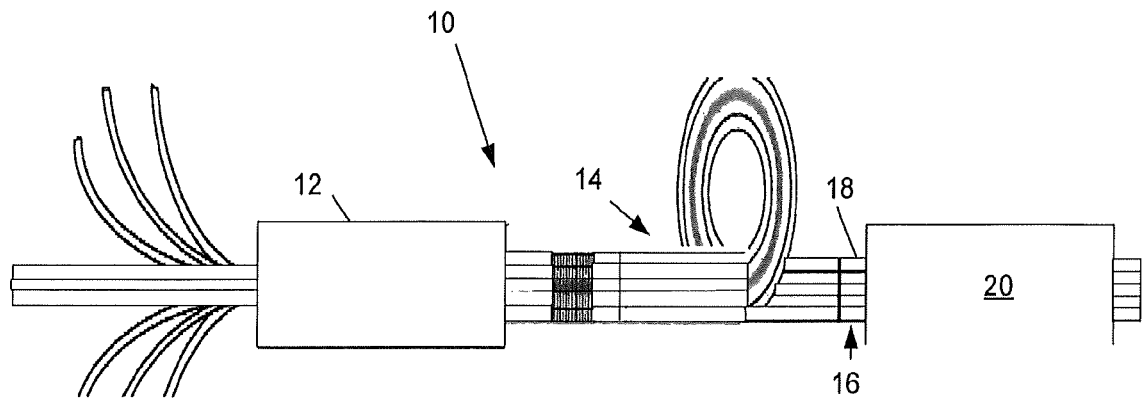
FIG. 1 is a diagrammatic view of a high power fiber laser system provided with the disclosed CMS.

Reference will now be made in detail to the disclosed energy absorber, high power fiber laser system incorporating the absorber and a method for manufacturing the latter. Wherever possible, same or similar reference numerals are used in the drawings and the description to refer to the same or like parts. The drawings are in simplified form and are far from precise scale. Unless specifically noted, it is intended that the words and phrases in the specification and claims be given the ordinary and accustomed meaning to those of ordinary skill in the fiber laser arts.

FIG. 1 illustrates a high power fiber laser system 10 operative to emit a system beam substantially in a fundamental mode. The system 10 is composed of one or more gain blocks 14 pumped by a plurality of pump sources. The latter are combined in a tapered fused bundle pump and signal combiner 12 so as to lunch pump light into the cladding and signal into the core of a double clad gain fiber of gain block 14. Pump light which is not absorbed by a gain medium continues its propagation along a path through a cladding of double clad fiber 16 and, as known to POSITA, and may detrimentally affect the integrity of a protective coating 18 covering the cladding. Hence the removal of cladding light is important and typically realized by a clad mode absorber or stripper ("CMS") 20 installed along the upstream of output fiber 16. The coating 18 is particularly vulnerable during a switch-on operation phase of system 10 during which light power increases from 0 to the desired kW level within, as a rule, about one hundred milliseconds.

Figure 2:
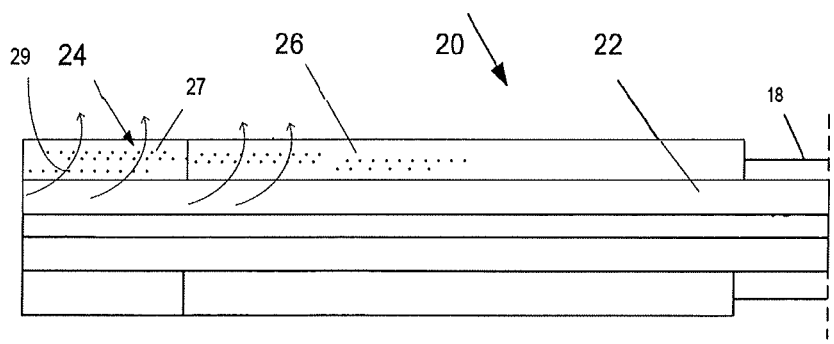
FIG. 2 is a diagrammatic view of the disclosed CMS configured in accordance with one of the inventive embodiments.
Figure 2A:
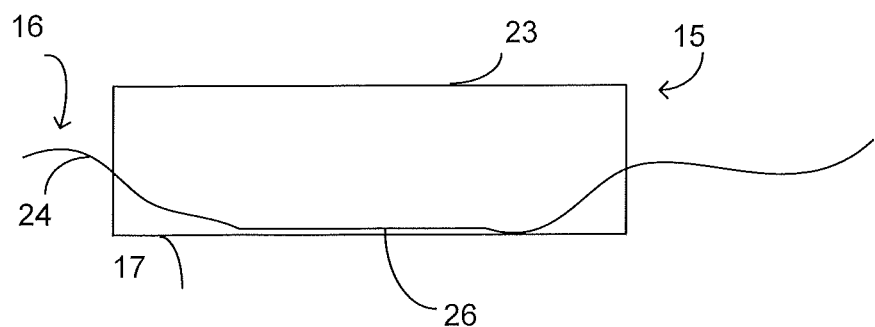
FIG. 2A is a diagrammatic side elevation view of the assembly including the CMS of FIG. 1.
Figure 2B:
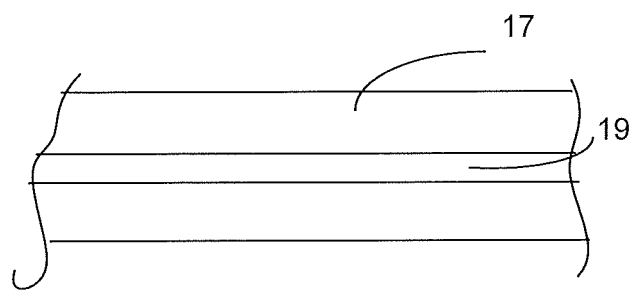
FIG. 2B is a top view of the assembly of FIG. 2A.

Referring to FIGS. 2A and 2B, CMS 20 is configured with a housing 15 receiving a portion of fiber 16 which is provided with an absorber as disclosed below. The fiber 16 extends through a side wall of housing 15 and gradually lowers to its bottom 17. In the following text, a gradually lowering or slacked portion of CMS 20 is further referred to as an upstream zone 24, whereas the portion in contact with bottom 17 is referred to as a downstream zone 26 of CMS 20. The housing 16 is further filled with a putting or host material and typically is closed by a lid 23.

The fiber 16 is placed in a groove 19 (FIG. 2B) provided on the bottom of housing 15 so that downstream zone 26 is in continuous contact with the bottom of groove 19. It has been noticed that even a small gap between downstream zone 26 and groove's bottom substantially reduces absorption of clad light by CMS 20. However, placing entire fiber 16 in contact with the bottom of groove 19 substantially increases optical power density of the decoupled light during a switch-on phase which leads to a high failure rate of absorber 20. It is believed that when the entire length of fiber 16 is in contact with the housing, the decoupled light, incident on the housing, generates high heat density which causes a putting material or silicone to burn. This problem can be alleviated by lifting at least upstream zone 24 above the bottom of the groove. A maximum distance between the very upstream of fiber 16 and the bottom preferably varies between about 100 and about 400 μm. At about 400 μm distance, the failure rate dropped to practically zero. Optionally, the very downstream end CMS 20 may be elevated as well.

Referring to FIG. 2, disclosed CMS 20 is coated along a portion of cladding 22 after the removal of protective coating 18 of output double clad fiber 16 of block 14 of FIG. 1. In accordance with the disclosure, CMS 20 is composed of host material having a coefficient of refraction only slightly above than or the same as or slightly lower than that of cladding 22 which is made of fused quartz having a refractive index of about 1.46 at the desired wavelength. Preferably, the refractive index of putting material varies between about 1.45 and 1.47.

In accordance with one aspect of the disclosure, CMS 20 includes a mixture of host material 27, such as Si configured with a relatively high refractive index at room temperature, and Si-based diffusers 29 with a refractive index lower than that of the host material. The embedded Si-based diffusers 29 not only form centers of scattering, but also they lower effective index flab of the mixture to at most equal to, but preferably lower than refractive index rid of quartz.

As unabsorbed pump light Lp is coupled into cladding 22, a portion thereof may decouple into upstream zone 24 of CMS 20 and encounter diffusers 29 which scatter light incident thereupon within host material 27. Some of the scattered light eventually leaves upstream decoupling zone 24 which gradually heats reducing the effective index even lower. As the index of CMS 20 along its upstream zone 24 falls even further below that of cladding 22, the unscattered light continues its propagation along cladding 22 gradually losing its power as subsequent portions of light keep colliding with diffusers 29 along at least one or more downstream decoupling zones 26 (FIG. 2A). However, in contrast to upstream zone 24, downstream zone 26 is already preheated and does not experience high thermal loads or high temporal gradient despite a greater amount of light decoupling from the cladding 22 and therefore high temperatures.

The cladding 22 is configured with rid of about 1.46. The host material 27 of CMS 20 at the desired wavelength preferably varies between about 1.46 and about 1.47. The diffusers 29 may be mixtures of silicone and dimethyl group (dimethylsiloxane) and have a refractive index of about 1.405. Alternatively, diffusers 29 may include fluorinated silicone with a refractive index lower than about 1.405, or phenylated silicon with a refractive index higher than 1.405. Typically, diffusers 29 are selected to reduce the effective refractive of the mixture to that of or lower than quartz. Preferably, the refractive index of diffusers 29 varies between about 1.4 and about 1.41. The weight percentage of embedded diffusers may varies from about 20% to about 50% of total weight of CMS 20, which leaves Si host material 27 ranging between about 80% and 50%.

According to a further aspect of the disclosure, removal of cladding light is realized by diffusers 29 made of particles of aluminum oxide Al2O3 which are embedded in host material 27. As disclosed above, CMS 20 is configured with upstream and downstream decoupling zones 24, 26 with respective relatively low concentration of $Al_2O_3$ or similar materials particles or diffusers and relatively high concentration thereof. The upstream zone 24 may have between about 3% and about 20% diffuser weight concentration. The weight concentration of the diffusers in the downstream region may vary between about 10% and 70%. By way of example, upstream region 24 is composed of about 10% diffuser weight concentration, whereas downstream region 26 is doped with about 67% concentration. The refractive index of the host material in combination with different concentration of the diffusers along the length of CMS 20 minimizes the undesired consequences of the switch-on phase, as discussed hereinbelow.

Figure 3A:
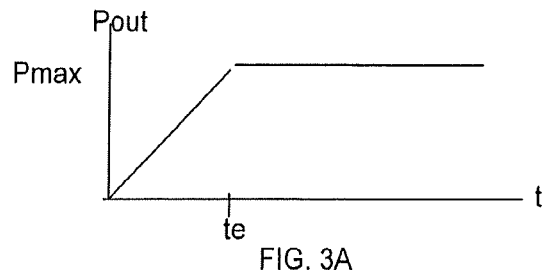
FIGS. 3A-3C illustrate the operation of the CMS during a switch-on phase of the fiber laser system of FIG. 1.
Figure 3B:
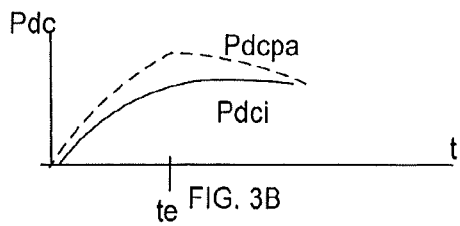
Figure 3C:
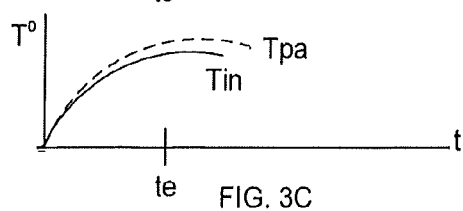

FIGS. 3A-3C illustrate the importance of the upstream region with a low concentration of diffusers during the switch-on phase of the system's operation. The maximum desired output Pmax in a kW power level laser system is reached in about 100 milliseconds which typically corresponds to the end of the switch-on phase te, as shown in FIG. 3A. As the output power Po reaches its maximum, the power of decoupled light Pdc also at its maximum often resulting in unacceptably high temperatures at a location x of the CMS's length, which is very close to its upstream end as shown by a phantom line Pdcpa of FIG. 3B.

To reduce the decoupled power at the end of the switch-on phase, some of the decoupled light power should be dissipated prior to the peak of decoupling. This is attained by upstream region 24 of CMS 20 along which a portion of scattered clad light decouples from cladding 22. Accordingly, by the end of the switch-on phase, when the output power of the system is at its highest, the clad light reaches downstream region 26 where it decouples at somewhat reduced power Pdci as shown in FIG. 3B.

A thermal stress corresponds to a thermal gradient $dT/dx$, where x is a location of decoupling. The thermally induced stress corresponds to a $dPdci/dte$ at the end of the switch-on phase. Increasing the time of induced emission front reduces a temperature gradient at the time of decoupling with the maximum decoupled power Pdci being lower than a stress threshold on the fiber. The solid line Tin of FIG. 3C clearly shows that a stress on the fiber configured in accordance with the disclosure is lower than a threshold. In contrast, as indicated by dash-line Tpa representing the known prior art, the critical threshold is considerably exceeded. As a consequence, the disclosed structure is much more resistant to the detrimental effects of the decoupling during a switch-on phase than the known prior art systems.

Figure 4:
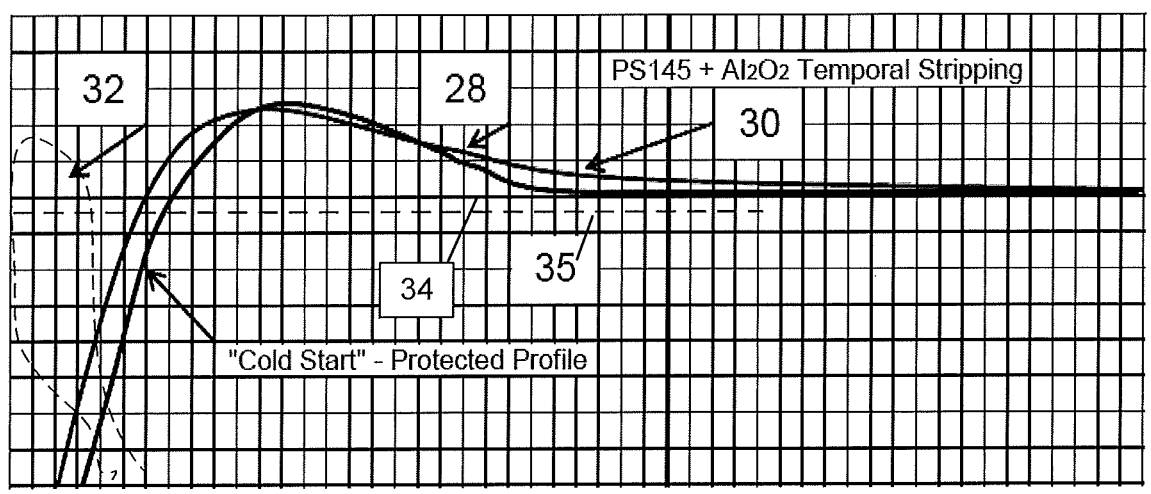
FIG. 4 illustrates the distribution of a thermal stress in a CMS configured in accordance with the known prior art and the disclosed CMS during a switch-on phase of laser system's operation.

FIG. 4 illustrates theoretically modeled curves 28 and 30 representing the CMS which is configured with only the host material and CMS of of FIGS. 2 and 2A-2B, respectively. During a switch-on phase, a maximum temperature in CMS 20 of the present disclosure is reached at $t2-t1$ later than the maximum temperature of the CMS made only from the host material. This temporal difference allows a portion of high numerical aperture cladding light incident on diffusers to scatter along upstream region 24 and pre-warm downstream region 26. As shown, a thermal stress on the disclosed CMS represented by a dash line 34 never reaches a fracture threshold 35. In contrast, a CMS configured according to the known prior art and represented by curve 32 exceeds a thermal fiber fracture threshold.

Figure 5:
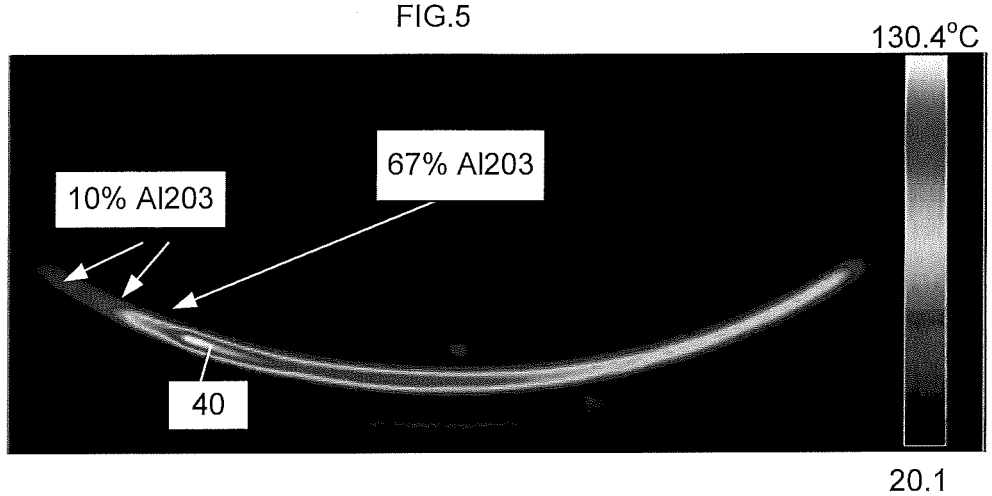
FIG. 5 illustrates a computer-generated thermal image of the CMS's operation during its switch-on phase.

FIG. 5 clearly illustrates advantages of the disclosed structure which includes diffusers 29 made of aluminum oxide. The 10% $Al_2O_3$ upstream region of the inventive CMS remains slightly heated during a switch-on phase. Even the 67% $Al_2O_3$ downstream region of the disclosed CMS does not exhibit a detrimentally high temperature. A hot spot 40 with the highest temperature is generated downstream from the border between upstream and downstream decoupling zones. At the moment of initial, most intense decoupling, the host material of the disclosed CMS already waveguides the cladding light and thus does not significantly contribute to the temperature increase. Substantially only $Al_2O_3$ diffusers interact with light along the CMS-cladding interface and scatter it so that some light incident on the diffusers remains in the host material. However, the light intensity within the material is such that a thermal stress does not damage the fiber. The maximum temperatures detected during multiple experiments do not exceed about 130° C.

Figure 6:
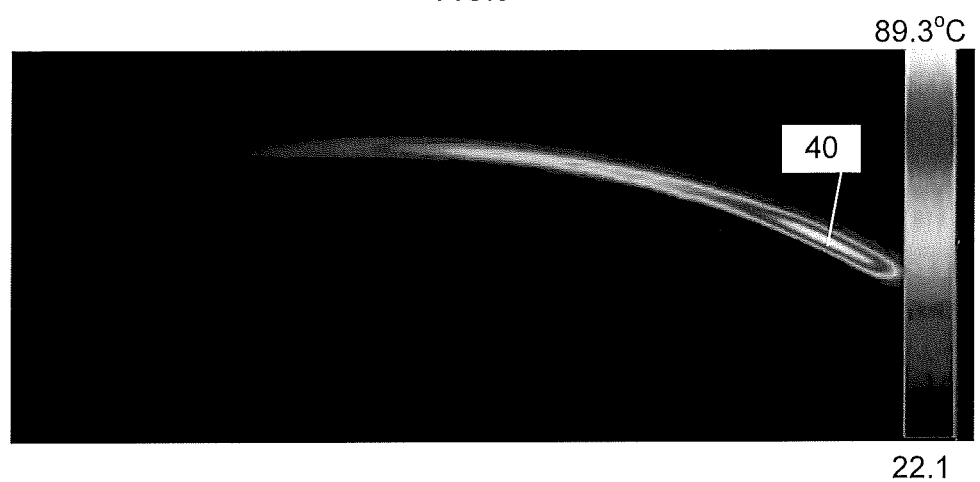
FIG. 6 illustrates a computer-generated thermal image of the CMS's operation during established thermal conditions of the system at an input power of about 100 W.
Figure 7:
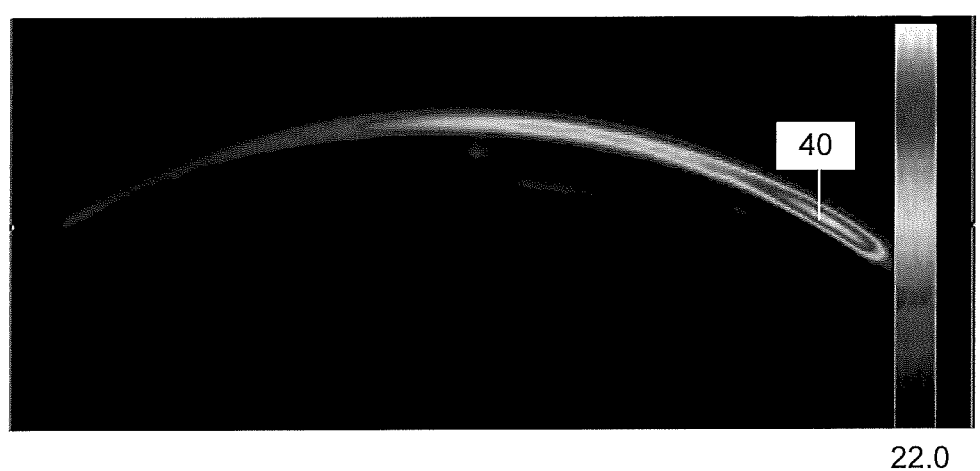
FIG. 7 illustrates a computer-generated thermal image of the CMS's operation during established thermal conditions of the system at an input power of about 200 W.

Referring to FIGS. 6 and 7, disclosed CMS 20 is also effective to distribute induced emission along a large portion of downstream region 26 during the laser system's operation following a switch-on phase. Both FIGS. 6 and 7 illustrate hot spot 40 at the end of CMS 20 during a stable operation of laser system with respective highest temperatures not exceeding about 90° C. at 100 W of input power and about 116° C. at about 200 W of input power, respectively. With the combination of the disclosed host material and diffuser concentration, CMS 20 is operative to decouple substantially the entire cladding light including that during the switch-on phase. Although technologically difficult, even better results were obtained in the disclosed CMS not with a step-wise profile of diffuser concentration, but with a gradually increasing percentage of diffusers distributed along the entire length of the CMS.

By way of example, excellent results have been shown by a CMS 20 having a length of about 130 mm. The 20 mm long upstream region contains a mixture of silicone with a refractive 1.45 and 10% of $Al_2O_3$ diffuser concretion. The downstream region of CMS 20 has the same host material and 67% of the diffusers. In order to protect the entrance area from sharp temperature rise, about 20 mm of entrance area was potted with silicone PS145 having a coefficient of refraction of about 1.45 doped with a 10% of $Al_2O_3$. The structure was placed in a curved aluminum housing to facilitate decoupling of small numerical aperture modes. More than hundred CMSs configured in accordance with the disclosure were tested and none failed during the switch-on phase. The concentration of diffusers can be controllably altered subject to the limitation of the present disclosure.

Having described at least one of the preferred embodiments of the present invention with reference to the accompanying drawings, it is to be understood that the invention is not limited to those precise embodiments. For example, different host materials may be easily utilized subject to the disclosed difference between indices of respective stripper and cladding. The concentration of diffusers also may be altered provided a downstream region of the disclosed stripper is doped with the highest concentration. Thus various changes, modifications, and adaptations including different materials, dopant concentration, diffusers and dimensions may be effected therein by one skilled in the art without departing from the scope or spirit of the invention as disclosed above.

The invention claimed is:
1. A device for gradually removing cladding modes during a switch-on operational phase of high power single mode fiber laser system, comprising:
  a double-clad fiber including a core and a cladding surrounding the core;
  a light absorber being in direct contact with a portion of the cladding and including a mixture of host material and plurality of passive light diffusers, which are embedded in the host material to provide the mixture with an effective refractive index at most equal to a refractive index of the cladding, the passive diffusers scattering clad light incident thereupon along an entire length of the absorber so that an upstream zone of the absorber heats at a temperature lower than that of at least one downstream zone, wherein the clad light is substantially removed from the cladding at an end of the switch-on phase.

2. The device of claim 1, wherein the host material includes silicone configured with a refractive index which varies from about 1.46 to about 1.47.

3. The device of claim 2, wherein the diffusers are configured with a refractive index varying between about 1.4 and about 1.41 and selected from the group consisting of dimethylsiloxane, fluorinated silicone and phenylated silicon and a combination thereof, the mixture including from about 20% to about 50% of the diffusers and from about 80% to about 50% of the host material.

4. The device of claim 3, wherein the dimethylsiloxane, fluorinated silicone and phenylated silicone are configured with respective 1.405, lower than 1.405 and higher than 1.405 refractive indices.

5. The device of claim 2, wherein the diffusers are embedded in the host material uniformly along the entire length of the absorber or in step-wise manner with the upstream zone provided with a lowest concentration of the diffusers or with gradually increasing concentration of the diffusers towards the downstream zone.

6. The device of claim 1, wherein the host material includes silicone configured with a refractive index at most equal to 1.46, the diffusers including particles of aluminum oxide ($Al_2O_3$).

7. The device of claim 6, wherein a weight concentration of the diffusers embedded along the upstream zone of the absorber varies between 3% and 20% and along the downstream zone between about 20% and about 70%.

8. The device of claim 6, wherein the refractive index of the host material is lower than a refraction index of the inner cladding from about 0.001 to about 0.003.

9. The device of claim 6, wherein a concentration of the diffusers increases gradually toward the downstream zone or in a stepwise manner with the downstream zone having the highest concentration of the diffusers.

10. The device of claim 1, wherein the upstream zone is about 20 mm long and the downstream zone is about 110 mm long.

11. A clad light absorber assembly, comprising:
a housing provided with a grooved bottom and at least one wall extending along a perimeter of the bottom;
a double-clad fiber configured with a core, a cladding surrounding the core and a coating along the cladding, an upstream end of the fiber being stripped from the coating and enclosed in the housing between opposite locations of the wall so that an upstream zone of the mounted end slants downwards to the grooved bottom and runs into at least one downstream zone extending along and in contact with the grooved bottom; and
a mixture applied to the cladding along the mounted end of the fiber and configured to remove clad light propagating along the cladding, the mixture including:
a host material, and
a plurality of light diffusers embedded in the host material to provide the mixture with a refractive index at most equal to that of the cladding, the diffusers being configured to scatter clad light incident thereupon along an entire length of the absorber so that the upstream zone heats at a temperature lower than that of the at least one downstream zone as the clad light is removed along the entire length of the absorber.

12. The system of claim 11, wherein the host material includes silicone configured with a refractive index which varies from about 1.46 to about 1.47 at a desired wavelength.

13. The system of claim 12, wherein the diffusers are configured with a refractive index varying between about 1.4 and about 1.41 and selected from the group consisting of dimethylsiloxane, fluorinated silicone and phenylated silicon and a combination thereof, the mixture including from about 20% to about 50% of the diffusers and from about 80% to about 50% of the host material.

14. The system of claim 13, wherein the dimethylsilioxane, fluorinated silicone and phenylated silicone are configured with respective 1.405, lower than 1.405 and higher than 1.405 refractive indices.

15. The system of claim 12, wherein the diffusers are embedded in the host material uniformly along the entire length of the absorber or in step-wise manner with the upstream zone provided with a lowest concentration of the diffusers or with gradually increasing concentration of the diffusers towards the downstream zone.

16. The system of claim 11, wherein the host material includes silicone configured with a refractive index at most equal to 1.46, the diffusers including particles of aluminum oxide ($Al_2O_3$).

17. The system of claim 16, wherein a weight concentration of the diffusers embedded along the upstream zone of the absorber varies between 3% and 20% and along the downstream zone between about 20% and about 70%.

18. The system of claim 16, wherein the refractive index of the host material is lower than a refraction index of the inner cladding from about 0.001 to about 0.003.

19. The system of claim 16, wherein a concentration of the diffusers increases gradually toward the downstream zone or in a stepwise manner with the downstream zone having the highest concentration of the diffusers.

20. The system of claim 11 further comprising another downstream zone slanting upwards from the at least one downstream zone to the location at the wall, the upstream zone being about 20 mm long and the downstream zone being about 110 mm long.

21. A single mode ("SM") high power fiber laser system comprising;
at least one fiber gain block receiving pump light and configured to amplify signal light at a desired wavelength, the gain block including a passive output double clad fiber configured with a core which guides the signal light, a cladding, which surrounds the core and receives unabsorbed pump light, and a coating along the cladding, an upstream end of the fiber being stripped from the coating;
a housing provided with a grooved bottom and enclosing the upstream end of the fiber so that an upstream zone of the mounted end slants downwards to the bottom and runs into at least one downstream zone supported by the grooved bottom; and
a mixture applied to the cladding along the mounted end of the fiber and including:
a host material filling the housing, and
a plurality of light diffusers embedded in the host material to provide the mixture with a refractive index at most equal to that of the cladding and configured to gradually scatter the cladding-guided unabsorbed pump light incident thereupon along an entire length of the upstream end of the fiber so that the upstream zone is heated at a temperature lower than that of the downstream zone.

22. The system of claim 21, wherein the host material includes silicone configured with a refractive index which varies from about 1.46 to about 1.47 at a desired wavelength.

23. The system of claim 22, wherein the diffusers are configured with a refractive index varying between about 1.4 and about 1.41 and selected from the group consisting of dimethylsiloxane, fluorinated silicone and phenylated silicon and a combination thereof, the mixture including from about 20% to about 50% of the diffusers and from about 80% to about 50% of the host material.

24. The system of claim 23, wherein the dimethylsilioxane, fluorinated silicone and phenylated silicone are configured with respective 1.405, lower than 1.405 and higher than 1.405 refractive indices.

25. The system of claim 22, wherein the diffusers are embedded in the host material uniformly along the entire length of the absorber or in step-wise manner with the upstream zone provided with a lowest concentration of the diffusers or with gradually increasing concentration of the diffusers towards the downstream zone.

26. The system of claim 21, wherein the host material includes silicone configured with a refractive index at most equal to 1.46, the diffusers including particles of aluminum oxide ($Al_2O_3$).

27. The system of claim 26, wherein a weight concentration of the diffusers embedded along the upstream zone of the absorber varies between 3% and 20% and along the downstream zone between about 20% and about 70%.

28. The system of claim 26, wherein the refractive index of the host material is lower than a refraction index of the inner cladding from about 0.001 to about 0.003.

29. The system of claim 26, wherein a concentration of the diffusers increases gradually toward the downstream zone or in a stepwise manner with the downstream zone having the highest concentration of the diffusers.

30. The system of claim 21 further comprising another downstream zone slanting upwards from the at least one downstream zone to the location at the wall, the upstream zone being about 20 mm long and the downstream zone being about 110 mm long.

31. The system of claim 21 further comprising an addition mode stripper configured substantially to the one mode stripper and dispose along the other of the double clad fibers.

32. The SM high power fiber laser system of claim 21, wherein the bottom of the housing is curved.

* * * * *